William B. Banks
INVENTOR.

ATTORNEYS

March 23, 1971 — W. B. BANKS — 3,572,094
GAS DENSITY MEASURING APPARATUS
Filed April 18, 1969 — 2 Sheets-Sheet 2

William B. Banks
INVENTOR.

BY
ATTORNEYS

United States Patent Office 3,572,094
Patented Mar. 23, 1971

3,572,094
GAS DENSITY MEASURING APPARATUS
William B. Banks, Houston, Tex., assignor to
Automation Products, Inc., Houston, Tex.
Filed Apr. 18, 1969, Ser. No. 817,364
Int. Cl. G01n 29/02
U.S. Cl. 73—30                                          4 Claims

ABSTRACT OF THE DISCLOSURE

Apparatus for measuring the density of gas flowing through an orifice in a line having an enclosed sample chamber positioned inside of the line with its exterior in contact with the flowing gas so that the chamber temperature will be maintained at the temperature of the flowing gas, an inlet line supplying a sample of gas to be measured from the line on a first side of the orifice to the sample chamber and an outlet line having a restriction therein connected from the sample chamber to the line on a second side of the orifice thereby maintaining the gas in the sample chamber at approximately the pressure on the first side of the orifice, and a gas density measuring instrument in the sample chamber. Valves in the inlet and outlet lines and a passageway between the chamber and a point exteriorly of the pipeline for isolating the sample chamber and admitting a calibration gas to the chamber for calibration. The pipeline including an enlarged passageway into which the sample chamber is positioned thereby avoiding restricting gas flow through the pipeline by the sample chamber.

BACKGROUND OF THE INVENTION

A simplified method of measuring flowing gas through a pipeline is by measuring the mass of the gas flowing through an orifice. Thus the flow rate of the gas in pounds per hour is proportional to the square root of the differential pressure across the orifice plate times the density of the gas. In order to provide an accurate mass measurement of the gas, an accurate apparatus for measuring the density of gas or densitometer is required. One of the difficulties in densitometers is that the gas temperature in the sample chamber should be the same as the gas temperature through the orifice since a temperature difference of 5° F. will cause a 1% difference in the density reading. The present invention provides an improved structure over my prior Pat. No. 3,276,264.

SUMMARY

The present invention is directed to an apparatus for measuring the density of gas flowing through an orifice in a line in which an enclosed sample chamber is positioned inside of the line with its exterior in contact with the flowing gas of the line whereby the temperature of the sample chamber will be maintained at the temperature of the flowing gas.

Another feature of the present invention is the provision of a large spool for placement in the line into which the sample chamber is positioned whereby the flowing gas through the line is unrestricted.

A further feature of the present invention is the combination of a sample chamber and calibration chamber which is positioned inside of a line whereby the temperature of the chamber will be maintained at the temperature of the flowing gas and an inlet line is connected from the line preferably upstream of an orifice to the sample chamber and an outlet line is connected between the sample chamber and the line preferably downstream of the orifice with a restriction in the outlet line for establishing flow through the sample chamber, but at the upstream flow line pressure and valves are provided in the inlet and outlet lines for shutting off flow through the sample chamber so that it may be calibrated at gas temperature in the line.

A still further object of the present invention is the provision of a gas densitometer which combines the function of a calibration chamber, sampler, and temperature chamber.

DESCRIPTION OF THE PREFERRED EMBODIMENT

Figure 1:
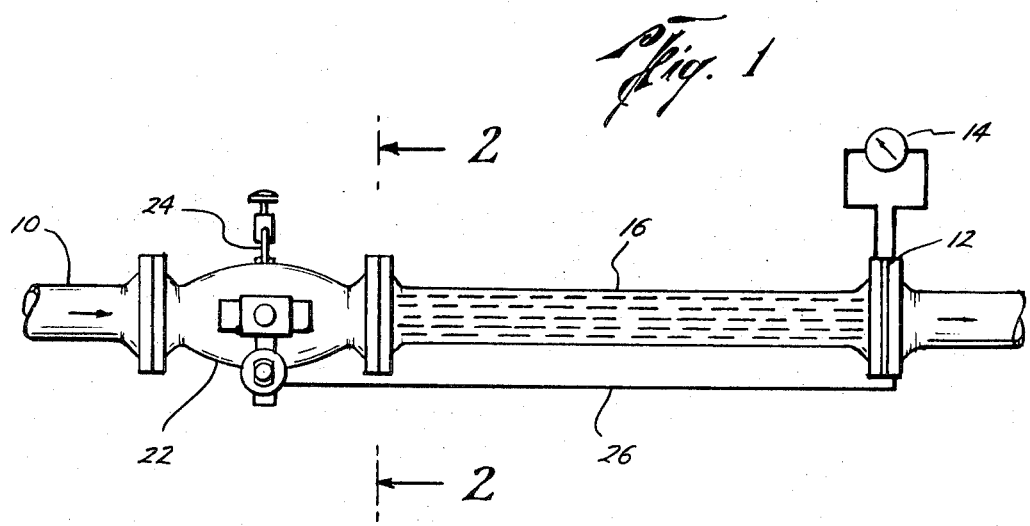
FIG. 1 is an elevational view showing the installation of the present gas density measuring apparatus in a pipeline having an orifice.

Referring now to FIG. 1, a conventional pipeline or conduit 10 through which flowing gas is moved is provided with a conventional orifice meter run which generally includes an orifice plate 12, a meter 14 for measuring the differential pressure across the orifice plate and may possibly include straightening vanes 16 indicated in dotted outline as is conventional in orifice measurements.

Figure 2:
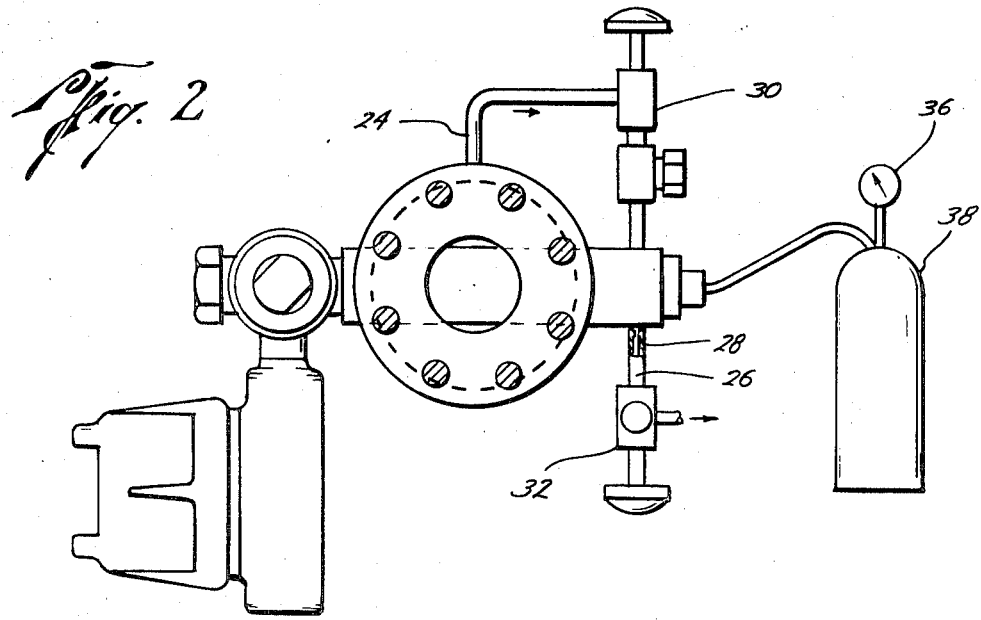
FIG. 2 is an enlarged, cross-sectional view taken along the line 2—2 of FIG. 1 including a schematic of calibration equipment.
Figure 3:
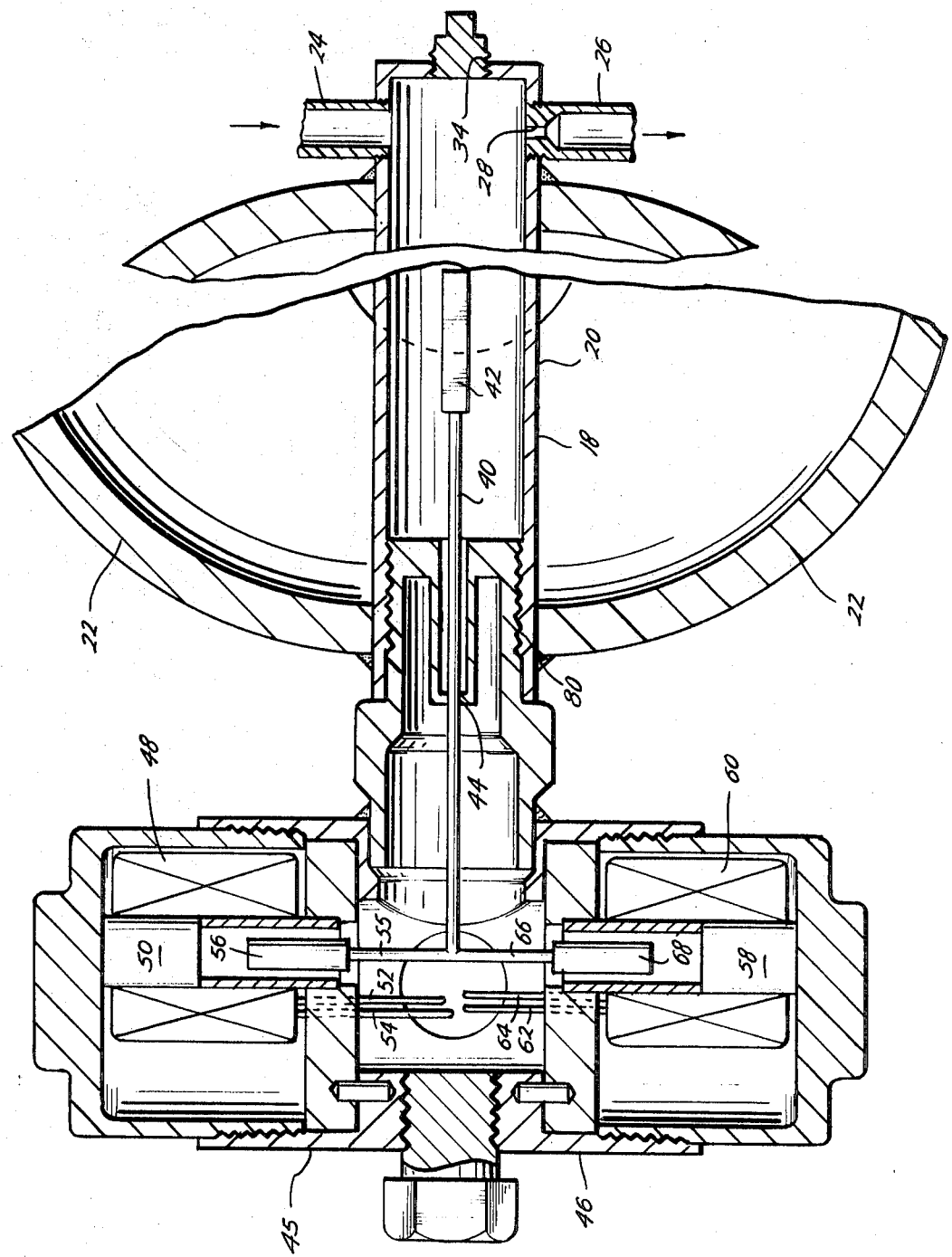
FIG. 3 is an enlarged, fragmentary cross-sectional view taken through the sample chamber of the present invention.

Referring now to FIGS. 1, 2 and 3 an enclosed sample chamber 18 is provided positioned inside of the line 10, preferably upstream of the orifice plate 12 although it can also be installed downstream if desired. It is noted that the exterior surface 20 of the chamber 18 is in contact with the gas flowing through the line 10 thereby insuring that the temperature in the chamber 18 will be maintained at all times at the temperature of the flowing gas. Chamber 18 is in communication with the exterior of the pipeline for inserting and removing the flexible element preferably as by threads 80.

In the larger lines, such as six inch and larger, the chamber 18 may be inserted directly into the line without adversely affecting or restricting the flow of gas therethrough. However, in smaller lines, it is preferable to insert a spool 22 (FIG. 1) having an enlarged cross-sectional area therein in which the chamber 18 is inserted thereby insuring that the gas flowing through the line 10 is not adversely restricted by the chamber 18.

An inlet line 24 is provided connected between the line 10 at a point preferably upstream side of the orifice 12 and to the sample chamber 18 for admitting a sample of gas to the chamber 18. In order to provide a flow through the sample chamber 18 an outlet line 26 is provided from the sampling chamber 18 to the pipeline 10 at a point downstream of the orifice plate 12 to the line 10. As best seen in FIGS. 2 and 3, a restriction or choke 28 is provided preferably in line 26 to maintain the sample in the sample chamber 18 at the upstream flow line pressure. Furthermore, the restriction or choke 28 limits the flow which bypasses the measuring orifice 12 to a negligible quantity. Thus, with the lines 24 and 26 connected across the orifice 12 a differential pressure will be created through the lines 24 and 26 to cause a continuous sample of gas from the pipeline to flow through the sample chamber 18 to provide an accurate measurement of the density of the flowing gas in the line 10. While it is preferable that the measuring chamber 18 be on the upstream side of the orifice 12 as shown in FIG. 1, the chamber 18 may be placed downstream of the orifice 12 so long as the lines 24 and 26 are placed on opposite sides of the orifice 12 to create a differential pressure to provide a sampling flow of gas through the chamber 18.

A first or inlet valve 30 is provided in line 24 and a second or outlet valve 32 is provided in line 26 for isolating the chamber 18 for calibration purposes. Referring to FIG. 3, an opening or passageway 34 is provided connected between the sample chamber 18 and a point exteriorly of the pipeline 10 for connection to a gauge 36 and supply 38 of a calibrating gas such as nitrogen. Since the sample chamber 18 will be maintained at the flow line temperature even when the valves 30 and 32 are closed off, the chamber may be calibrated for known values of density by any gas having a known PVT relationship.

Any suitable means for measuring the density of the gas such as shown in my Pats. Nos. 2,973,639, 3,100,390 or 3,282,084 may be used. For instance, and referring to FIG. 3, a gas density measuring apparatus 45 is provided having a flexible vibratory element 40 provided to which a paddle 42 may be secured if desired for greater sensitivity, and which is supported for vibratory movement at a point 44, preferably adjacent the node point of the natural resonant frequency of the element 40. Means are provided for vibrating the rod 40, and means are provided for measuring the vibration of the rod 40 which is a measure of the density of the gas in the sample chamber 18.

Electromagnetic vibration drive means may be enclosed in a housing 46 and generally includes an electromagnetic coil 48, a magnetic core 50, electrical connections 52 and 54 which supply electrical current from an external source to the coil 48 which sets up vibration in a vibratory armature 56 which is connected to arm 55 of the rod 44 whereby the rod 44 is vibrated at the frequency of the applied external source, preferably the natural resonant frequency of the element 40 for greater sensitivity.

The electromagnetic measuring means is also located in the housing 46 and generally includes a magnet 58, an electromagnetic coil 60 which is connected to electrical connections 62 and 64 which carry the signal generated in the detecting coil 60 to any suitable indicating device such as a volt meter or readout chart (not shown). Element 44 also includes an arm 66 which supports a magnetic armature 68 at its end which vibrates and induces a voltage in the coil 60 indicative of the amount of vibration of the flexible rod or element 44.

Thus, when the armature 56 is vibrated by coil 48 in response to an applied electrical signal, the element 44 and the material sensing paddle 42 will vibrate in accordance with that signal. Furthermore, the vibrating armature 68 will also vibrate in response to vibration of the element 44 and induce a signal in the electrical conductors 62 and 64 which is proportional to the amount of vibration of the element 44 which in turn depends upon the density of the gas in the chamber 18.

In use, it is noted that the sample chamber is subjected at all times to the temperature of the flowing gas in the pipeline 10. The sample chamber 18 may be isolated from the flow line 10 by closing both valves 30 and 32. With the chamber 18 isolated the unit may be calibrated. Thus, a supply of gas of known values of density may be connected to the opening or passageway 34 and the gas density measuring means 45 may be calibrated. Then with the opening or passageway 34 closed the valves 30 and 32 may be opened and a flow of gas from the line 10 will be established through the sample chamber 18 and the sample flowing therein will correspond to the gas flowing through the line 10. The density measuring instrument 45 will measure the gas density of the flowing sample which may then be combined with the differential pressure measurement indicated by the gauge 14 to provide a mass measurement of the gas flowing through the orifice 12.

The present invention, therefore, is well adapted to carry out the objects and attain the ends and advantages mentioned as well as others inherent therein.

What is claimed is:

1. An apparatus for measuring the density of gas flowing in a conduit having an orifice comprising,
an enclosed sample chamber positioned interiorly of the conduit on one side of the orifice with its exterior in contact with the flowing gas whereby the temperature of the chamber will be maintained at the temperature of the flowing gas,
a flexible vibratory element mounted for vibratory movement in said chamber,
means for vibrating said element,
means for measuring the vibration of said element,
a first line connected between the conduit on a first side of the orifice and the sample chamber,
a second line connected between the conduit on the second side of the orifice and the sample chamber,
a restriction in one of the lines for maintaining the gas flowing through the sample chamber at approximately the pressure on said first side of the orifice,
a first valve in the first line,
a second valve in the second line, and
a passageway between the chamber and a point exteriorly of the conduit for admitting a calibration gas to the chamber.

2. The apparatus of claim 1 including an enlarged passageway in the conduit into which the sample chamber is positioned for avoiding restricting the gas flow through the conduit by the chamber.

3. An apparatus for measuring the density of gas flowing in a pipeline having an orifice comprising,
an enclosed sample chamber positioned interiorly of the line on one side of the orifice with the exterior in contact with the flowing gas whereby the temperature of the chamber will be maintained at the temperature of the flowing gas,
a flexible elongate measuring element mounted for vibratory movement in said chamber,
said chamber in communication with the exterior of the pipeline for inserting and removing the flexible element,
means for vibrating said element,
means for measuring the vibration of said element whereby said measurement is an indication of the density of the contents of the chamber,
an inlet line connected between the pipeline on the upstream side of the orifice and the sample chamber,
an inlet valve in the inlet line,
an outlet line connected between the pipeline on the downstream of the orifice and the sample chamber,
an outlet valve in the outlet line,
a restriction in the outlet line for maintaining the gas flowing through the lines and the sample chamber at approximately the upstream pipeline pressure, and
a passageway between the chamber and a point exteriorly of the pipeline for admitting a calibration gas into the chamber.

4. The apparatus of claim 3 wherein the pipeline includes,
an enlarged spool into which the sample chamber is positioned whereby the flowing gas through the pipeline is unrestricted.

References Cited

UNITED STATES PATENTS

| 2,631,024 | 3/1953 | Beardsley | 73—30X |
| 2,703,494 | 3/1955 | Carney | 73—30 |
| 3,282,084 | 11/1966 | Banks | 73—32 |
| 3,359,784 | 12/1967 | Jorre et al. | 73—23 |

FOREIGN PATENTS

| 1,513,664 | 1/1968 | France | 73—32 |

RICHARD C. QUEISSER, Primary Examiner
E. J. KOCH, Assistant Examiner

U.S. Cl. X.R.

73—32